US010186010B2

(12) United States Patent
Liang et al.

(10) Patent No.: US 10,186,010 B2
(45) Date of Patent: Jan. 22, 2019

(54) ELECTRONIC DEVICE AND GRAPHICS PROCESSING UNIT CARD

(71) Applicant: Huawei Technologies Co., Ltd., Shenzhen, Guangdong (CN)

(72) Inventors: Wenliang Liang, Shanghai (CN); Liang Zhuang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 83 days.

(21) Appl. No.: 15/493,687

(22) Filed: Apr. 21, 2017

(65) Prior Publication Data

US 2017/0221175 A1 Aug. 3, 2017

Related U.S. Application Data

(63) Continuation of application No. PCT/CN2014/089323, filed on Oct. 23, 2014.

(51) Int. Cl.
| | |
|---|---|
| *G06F 1/12* | (2006.01) |
| *G06T 1/20* | (2006.01) |
| *G06T 1/00* | (2006.01) |
| *G06F 13/42* | (2006.01) |

(52) U.S. Cl.
CPC ............ *G06T 1/20* (2013.01); *G06F 13/4282* (2013.01); *G06T 1/00* (2013.01); *G06F 2213/0026* (2013.01)

(58) Field of Classification Search
None
See application file for complete search history.

(56) References Cited

U.S. PATENT DOCUMENTS

| 5,572,688 | A | 11/1996 | Sytwu |
| 7,412,554 | B2* | 8/2008 | Danilak ................. G06T 1/20 |
| | | | 710/305 |
| 8,739,179 | B2* | 5/2014 | Tripathi ................ G06F 9/544 |
| | | | 709/213 |
| 2006/0271713 | A1 | 11/2006 | Xie et al. |
| 2007/0139422 | A1 | 6/2007 | Kong et al. |
| 2007/0291039 | A1 | 12/2007 | Danilak |
| 2007/0294458 | A1* | 12/2007 | Danilak ............. G06F 13/4027 |
| | | | 710/313 |
| 2013/0124772 | A1 | 5/2013 | Zheng et al. |
| 2015/0149685 | A1* | 5/2015 | Fang ................. G06F 13/4068 |
| | | | 710/313 |

FOREIGN PATENT DOCUMENTS

| CN | 101089892 A | 12/2007 |
| CN | 102419620 A | 4/2012 |
| CN | 103105895 A | 5/2013 |
| CN | 103605404 A | 2/2014 |
| WO | 2006055279 A2 | 5/2006 |
| WO | 2006055608 A2 | 5/2006 |
| WO | 2008027328 A1 | 3/2008 |

* cited by examiner

*Primary Examiner* — Martin Mushambo

(57) ABSTRACT

Embodiments of the present invention disclose an electronic device and a graphics processing unit card, which can improve data input and output capabilities. The electronic device includes a graphics processing unit card and a mainboard. The graphics processing unit card includes a main chip and M first PCIe interfaces electrically connected to the main chip, where M is an integer greater than or equal to 2. The mainboard includes a processing unit and M second PCIe interfaces connected to the processing unit, and the M second PCIe interfaces are respectively connected to the M first PCIe interfaces.

13 Claims, 6 Drawing Sheets

ELECTRONIC DEVICE AND GRAPHICS PROCESSING UNIT CARD

CROSS-REFERENCE TO RELATED APPLICATIONS

This application is a continuation of International Application No. PCT/CN2014/089323, filed on Oct. 23, 2014, the disclosure of which is hereby incorporated by reference in its entirety.

TECHNICAL FIELD

This application relates to the field of electronic technologies, and in particular, to an electronic device and a graphics processing unit card.

BACKGROUND

A graphics processing unit (GPU), also referred to as a video core, a visual processing unit, or a video chip, is a specialized microprocessor that performs image calculation on a personal computer, a workstation, a game console, and some mobile devices (such as a tablet computer or a smartphone).

A main chip of a conventional graphics processing unit card is generally fastened on a circuit board, to form the graphics processing unit card. A Peripheral Component Interface Express (PCIe) interface (which is generally an edge connector) is disposed on the circuit board. When the graphics processing unit card needs to be fastened on a mainboard, the PCIe interface is directly inserted into a socket on the mainboard. The main chip is electrically connected to a processing unit on the mainboard, so that the main chip and the processing unit can transmit data to each other.

The main chip is applicable to a large-scale parallel data computation scenario because of a computing capability of the main chip. However, it is discovered during a use process that, if the main chip is applied to physical-layer computation, because there is only one PCIe interface, input and output capabilities of the graphics processing unit card are far lower than a processing capability of the main chip, and as a result, the processing capability of the main chip cannot be fully utilized.

SUMMARY

Embodiments of this application provide a graphics processing unit card that can improve data input and output capabilities and an electronic device that uses the graphics processing unit card.

An electronic device includes a graphics processing unit card and a mainboard. The graphics processing unit card includes a main chip and M first PCIe interfaces electrically connected to the main chip, where M is a natural number greater than or equal to 2. The mainboard includes a central processing unit and M second PCIe interfaces connected to the central processing unit, and the M second PCIe interfaces are configured to connect to the M first PCIe interfaces. The main chip of the graphics processing unit card includes a mode control module. When identifying that only one first PCIe interface of the graphics processing unit card transmits data to the central processing unit of the mainboard, the mode control module configures the graphics processing unit card to be in a single-card mode; or when identifying that N first PCIe interfaces of the graphics processing unit card transmit data to the central processing unit of the mainboard, the mode control module configures the graphics processing unit card to be in an interface extended mode, where N is a natural number less than or equal to M and greater than or equal to 2.

A graphics processing unit card includes a main chip and M PCIe interfaces electrically connected to the main chip. The M PCIe interfaces are configured to electrically connect to a mainboard, and M is an integer greater than or equal to 2. The main chip includes a mode control module. When identifying that only one PCIe interface of the graphics processing unit card transmits data, the mode control module configures the graphics processing unit card to be in a single-card mode, or when identifying that N PCIe interfaces of the graphics processing unit card transmit data, the mode control module configures the graphics processing unit card to be in an interface extended mode, where N is a natural number less than or equal to M and greater than or equal to 2.

M first PCIe interfaces electrically connected to the mainboard are disposed on the graphics processing unit card of the electronic device, where M is greater than or equal to 2. In this way, input and output capabilities of the graphics processing unit card are improved, and can match a processing capability of the main chip. This resolves a prior-art technical problem that the processing capability of the main chip cannot be fully utilized, where the problem is caused because there is only one PCIe interface, and as a result, the input and output capabilities of the graphics processing unit card is far lower than the processing capability of the main chip.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application.

DETAILED DESCRIPTION

To make persons skilled in the art better understand the technical solutions in this application, the following clearly describes the technical solutions in the embodiments of this application with reference to the accompanying drawings in the embodiments of this application. Apparently, the described embodiments are merely some but not all of the embodiments of this application.

Embodiment 1

Figure 1:
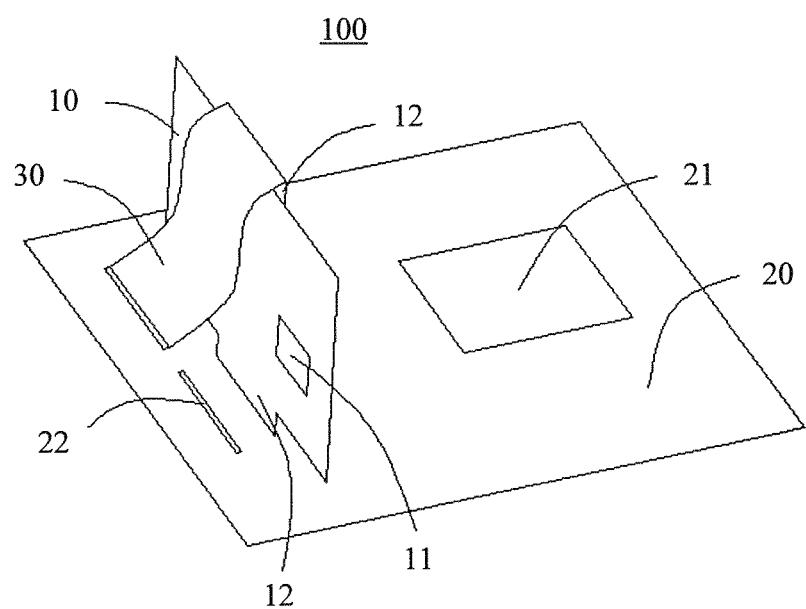
FIG. 1 is a schematic structural diagram of an electronic device according to an implementation manner of this application.

Embodiment 1 of this application provides an electronic device 100. The electronic device 100 may be a device such as a mobile phone, a computer, or a server. As shown in FIG. 1, the electronic device 100 includes a graphics processing unit card 10 and a mainboard 20.

Figure 3:
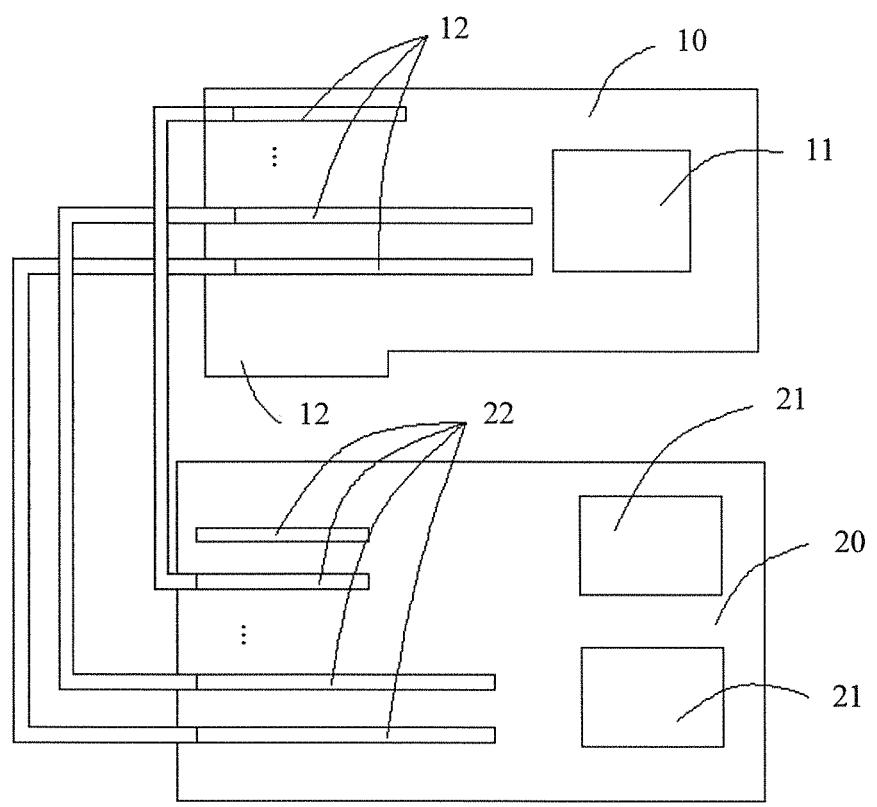
FIG. 3 is a schematic structural diagram of an electronic device according to another implementation manner of this application.

The graphics processing unit card 10 includes a main chip 11 and M first PCIe interfaces 12 electrically connected to the main chip 11. The main chip 11, also referred to as a video core, a visual processing unit, or a video chip, is a specialized microprocessor that performs an operation such as image processing or calculation on a personal computer, a workstation, a game console, and some mobile devices (such as a tablet computer or a smartphone). M is an integer greater than or equal to 2. As shown in FIG. 1, M is equal to 2, that is, a quantity of first PCIe interfaces 12 is two. For another example, as shown in FIG. 3, M is greater than 2, that is, a quantity of first PCIe interfaces 12 is greater than two.

Each first PCIe interface 12 of the M first PCIe interfaces 12 may be a male socket or a female socket. In this implementation manner, the first PCIe interfaces 12 are male sockets. In addition, the first PCIe interfaces 12 may be located on a same side edge of the graphics processing unit card 10 or may be located on different side edges of the graphics processing unit card 10. In this implementation manner, the two first PCIe interfaces 12 are located on two opposite side edges of the graphics processing unit card 10.

The mainboard 20 includes a central processing unit 21 and M second PCIe interfaces 22 connected to the central processing unit 21. The M second PCIe interfaces 22 are respectively configured to connect to the M first PCIe interfaces 12. A quantity of central processing units 21 may be one or more. As shown in FIG. 1, the quantity of central processing units 21 is one. As shown in FIG. 3, the quantity of central processing units 21 is two. In addition, the second PCIe interfaces 22 may be male sockets or female sockets. In this implementation manner, the second PCIe interfaces 22 are female sockets.

The M first PCIe interfaces 12 and the M second PCIe interfaces 22 may be connected in the following manners:

In a first manner, the M first PCIe interfaces 12 and the M second PCIe interfaces 22 are directly connected in an insertion manner. For example, the M first PCIe interfaces 12 are disposed on a same side edge of the graphics processing unit card 10, the M second PCIe interfaces 22 are arranged in a straight line, and a corresponding first PCIe interface 12 and second PCIe interface 22 are a pair of male socket and female socket. The M first PCIe interfaces 12 may be directly inserted into the second PCIe interface 22.

In a second manner, N first PCIe interfaces 12 of the M first PCIe interfaces 12 are indirectly connected to N second PCIe interfaces 22 of the M second PCIe interfaces 22, and M-N first PCIe interfaces 12 are directly inserted into M-N second PCIe interfaces 22, where N is a natural number less than or equal to M.

Specifically, the electronic device 100 further includes N signal cables 30. The signal cables 30 may be specifically flexible circuit boards, flat cables, cables, optical fibers, or the like. The N first PCIe interfaces 12 of the M first PCIe interfaces 12 are electrically connected to the N second PCIe interfaces 22 of the M second PCIe interfaces 22 by using the N signal cables 30, and the remaining M-N first PCIe interfaces 12 of the M first PCIe interfaces 12 are directly electrically connected to the remaining M-N second PCIe interfaces 22 of the M second PCIe interfaces 22. In this case, locations of the M first PCIe interfaces 12 may be disposed as required, for example, disposed on different side edges of the graphics processing unit card 10.

As shown in FIG. 1, N is a natural number less than M. M is equal to 2, and N is equal to 1. A quantity of signal cables 30 is one. One first PCIe interface 12 is connected to one second PCIe interface 22 by using the signal cable 30, and the other first PCIe interface 12 is directly inserted into the other second PCIe interface 22. As shown in FIG. 3, N=M-1, and a quantity of signal cables 30 is M-1. M-1 first PCIe interfaces 12 of the M first PCIe interfaces 12 are connected to M-1 second PCIe interfaces 22 of the M second PCIe interfaces 22 by using the signal cables 30, and the remaining one first PCIe interface 12 is directly inserted into the remaining one second PCIe interface 22.

In another implementation manner, N may be equal to M. When N is equal to M, a quantity of a first PCIe interface 12 directly inserted into a second PCIe interface 22 is zero, that is, all the first PCIe interfaces 12 of the M first PCIe interfaces 12 are connected to the M second PCIe interfaces by using the signal cables 30.

Specifically, the central processing unit 21 is configured to detect a processing scenario, a calculation complexity of data processing, or an actual throughput of the graphics processing unit card 10, to obtain a detection result; and determine, according to the detection result, a quantity of first PCIe interfaces 12 that need to be enabled or disabled in the M first PCIe interfaces 12. For example, in a scenario such as graphics processing, only one first PCIe interface 12 may be used. In this case, if the M first PCIe interfaces 12 are in an enabled state, other first PCIe interfaces 12 are disabled. In a scenario such as a communications system, two or more first PCIe interfaces 12 are used. In this case, if the M first PCIe interfaces 12 are in a disabled state, two or more first PCIe interfaces 12 are enabled. Moreover, when the actual throughput is detected, a relationship between the actual throughput and a bandwidth of the M first PCIe interfaces 12 is determined, to determine a quantity of first PCIe interfaces 12 that need to be enabled or disabled. For example, a wider bandwidth is required as the throughput increases, and therefore, more first PCIe interfaces 12 need to be enabled. For another example, data traffic increases as the calculation complexity of data processing increases, and a wider bandwidth is required; therefore, more first PCIe interfaces 12 need to be enabled.

The central processing unit 21 detects a processing scenario, a calculation complexity of data processing, or an actual throughput of the graphics processing unit card 10, to obtain a detection result; and determines, according to the detection result, a quantity of first PCIe interfaces that need to be enabled or disabled in the M first PCIe interfaces 12. In this way, not only a use requirement is satisfied, and input and output power consumption is also reduced.

Figure 2:
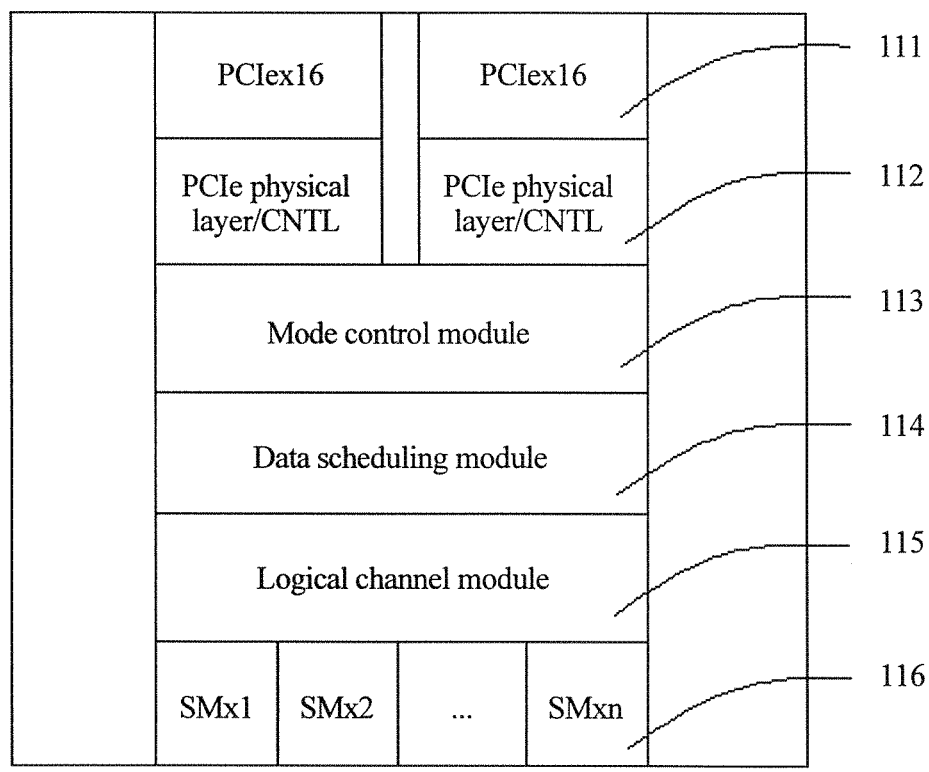
FIG. 2 is a block diagram of internal logic of a main chip in a graphics processing unit card of the electronic device in FIG. 1.

As shown in FIG. 2, the main chip 11 of the graphics processing unit card 10 includes a PCIe channel layer 111, a PCIe physical layer 112, a mode control module 113, a data scheduling module 114, a logical channel module 115, and multiple multi-core stream processors 116 (SM).

The PCIe channel layer 111 includes two PCIe channels. The two PCIe channels are correspondingly connected to two first PCIe interfaces, respectively. Specifically, the two PCIe channels and the two first PCIe interfaces may be connected by using a conducting wire such as a copper wire. A quantity of PCIe channels included in the PCIe channel layer 111 is the same as a quantity of PCIe interfaces of the graphics processing unit card 10. For example, when the graphics processing unit card 10 has M (M≥2) PCIe interfaces, the PCIe channel layer 111 includes M channels. A specification of the PCIe channel may be set as required, for example, set to a channel specification of X1, X2, PCIeX4, X8, X12, X16, X32, or the like. The PCIe physical layer 112 provides an environment for data transmission.

The mode control module 113 is configured to identify a quantity of first PCIe interfaces 12 that are of the M first PCIe interfaces 12 and that can transmit data currently, to obtain an identification result; and determine to allocate the multiple multi-core stream processors 116 according to the identification result. Specifically, when there are two first PCIe interfaces 12, when it is discovered during initialization that there is only one first PCIe interface 12 transmitting data (the other first PCIe interface 12 is in an idle state), the mode control module 113 configures the graphics processing unit card 10 to be in a single-card mode; or when there are two first PCIe interfaces 12 transmitting data, the mode control module 113 configures the graphics processing unit card 10 to be in an interface extended mode.

When the graphics processing unit card 10 is in a single-card mode, the graphics processing unit card 10 works in a regular mode, the mode control module 113 or an operating system identifies the graphics processing unit card 10 as a single graphics processing device, and the mode control module 113 allocates all the multiple multi-core stream processors 116 to the single graphics processing device. When the graphics processing unit card 10 is in an interface extended mode, the mode control module 113 or the operating system identifies the graphics processing unit card 10 as two graphics processing devices, and by default, the mode control module 113 allocates, according to access IO bandwidth, the multi-core stream processors 116 to the two graphics processing devices according to a bandwidth ratio of PCIe channels. For example, when the two graphics processing devices are both connected to X16 PCIe3.0 channels (where a bandwidth ratio is 1:1), and there are a total of 14 multi-core stream processors 116, the mode control module 113 allocates seven multi-core stream processors 116 to either of the two graphics processing devices. When one graphics processing device is connected to an X16 PCIe3.0 channel, and one graphics processing device is connected to an X16 PCIe2.0 channel, the mode control module 113 automatically allocates the multi-core stream processors 116 to the two graphics processing devices according to a ratio of 2:1 (because a bandwidth of the PCIe3.0 channel is about twice a bandwidth of the PCIe2.0 channel).

The data scheduling module 114 is configured to rearrange and cache data transmitted from different PCIe channels at different times, and schedule arranged data to different logical channels according to different modes of operation, to resolve a problem that data is not aligned in terms of time and space, thereby improving data synchronization.

The logical channel module 115 sends, to different multi-core stream processors for computation, the data sent from the data scheduling module 113, and then feeds back a computation result.

Figure 4:
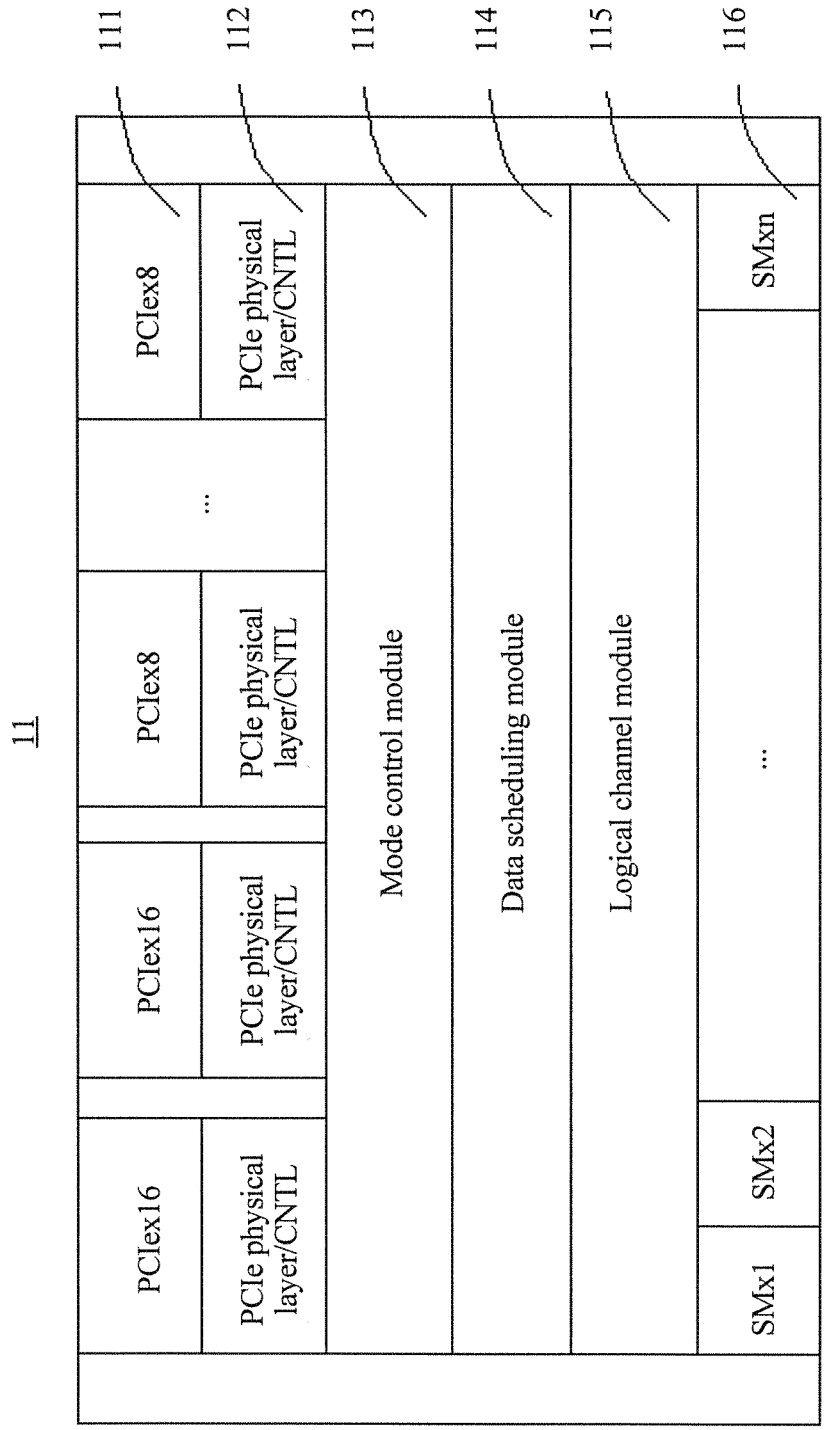
FIG. 4 is a block diagram of internal logic of a main chip in a graphics processing unit card of the electronic device in FIG. 3.

As shown in FIG. 4, FIG. 4 is a block diagram of internal logic of a main chip in a graphics processing unit card of the electronic device in FIG. 3 A difference from FIG. 2 lies in that a quantity of PCIe channels is different, and the quantity of PCIe channels is corresponding to the quantity of first PCIe interfaces in FIG. 3.

Figure 5:
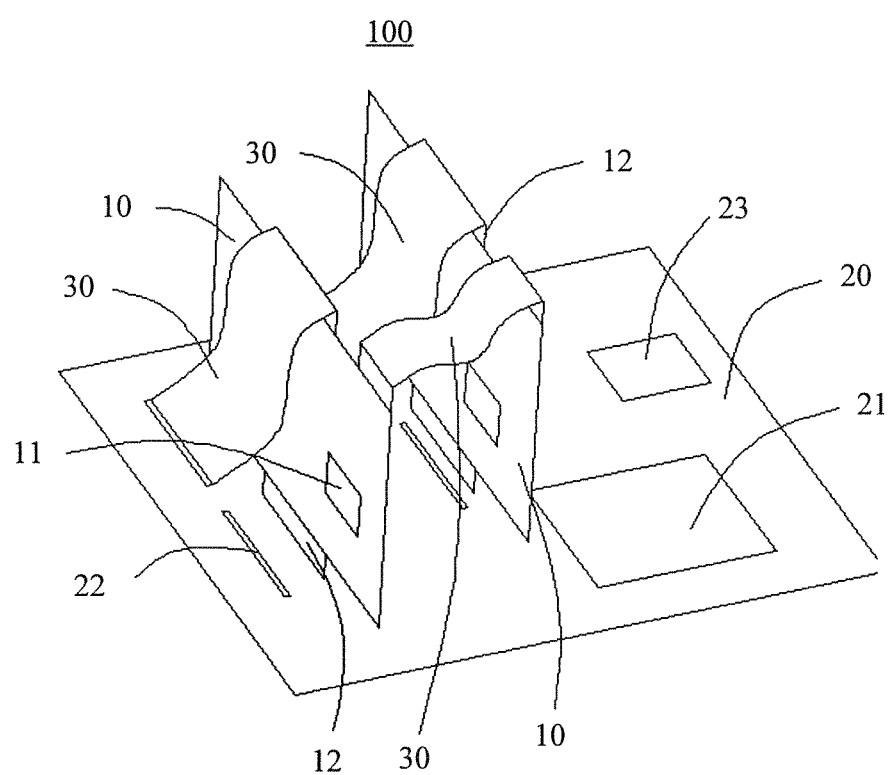
FIG. 5 is a schematic structural diagram of an electronic device according to still another implementation manner of this application.

In an implementation manner, as shown in FIG. 1, a quantity of graphics processing unit cards 10 is one. In another implementation manner, as shown in FIG. 5, a quantity of graphics processing unit cards 10 is two, and the two graphics processing unit cards 10 are electrically connected to each other. In another implementation manner, a quantity of graphics processing unit cards 10 may be more, and the multiple graphics processing unit cards 10 are electrically connected to each other, and are used in a scenario of accelerating multiple graphics processing unit cards during image processing. The mode control module 113 may be further configured to identify whether the electronic device 100 is in a multiple-graphics processing unit card mode. For example, when there are two or more graphics processing unit cards 10 inserted into (or connected to by using a signal cable) the mainboard 20, the mode control module 113 can identify that the electronic device 100 is in a multiple-graphics processing unit card mode.

M first PCIe interfaces 12 electrically connected to the mainboard 20 are disposed on the graphics processing unit card 10 of the electronic device 100, where M is greater than or equal to 2. In this way, input and output capabilities of the graphics processing unit card 10 are improved, and can match a processing capability of the main chip 11. This resolves a prior-art technical problem that the processing capability of the main chip cannot be fully utilized, and the problem is caused because there is only one PCIe interface, and as a result, the input and output capabilities of the graphics processing unit card is far lower than the processing capability of the main chip.

Embodiment 2

Figure 6:
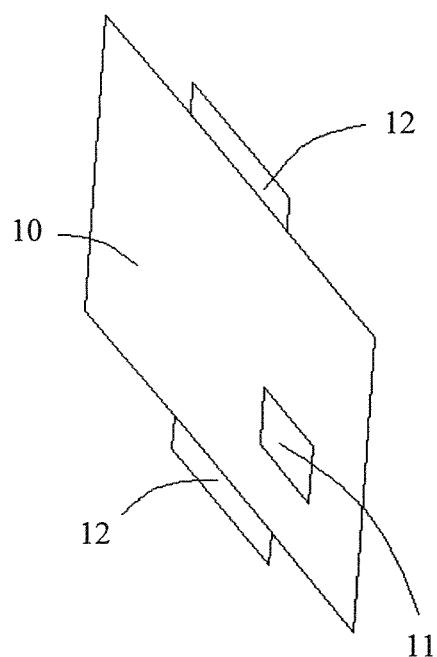
FIG. 6 is a schematic structural diagram of an embodiment of a graphics processing unit card.

Based on a same inventive concept, this application further provides a graphics processing unit card 10. As shown in FIG. 6, the graphics processing unit card 10 includes a main chip 11 and M first PCIe interfaces 12 electrically connected to the main chip 11, where M is an integer greater than or equal to 2. As shown in FIG. 1, M is equal to 2, that is, a quantity of first PCIe interfaces 12 is two. As shown in FIG. 3, M is greater than 2, that is, a quantity of first PCIe interfaces 12 is greater than two.

The first PCIe interfaces 12 may be male sockets or female sockets. In this implementation manner, the first PCIe interfaces 12 are male sockets, and the PCIe interfaces may include edge connectors. In addition, the first PCIe interfaces 12 may be located on a same side edge of the graphics processing unit card 10 or may be located on different side edges of the graphics processing unit card 10. In this implementation manner, as shown in FIG. 6, the two first PCIe interfaces 12 are located on two opposite side edges of the graphics processing unit card.

As shown in FIG. 2, the main chip 11 of the graphics processing unit card 10 includes a PCIe channel layer 111, a PCIe physical layer 112, a mode control module 113, a data scheduling module 114, a logical channel module 115, and multiple multi-core stream processors 116 (SM).

The PCIe channel layer 111 includes two PCIe channels. The two PCIe channels are correspondingly connected to two first PCIe interfaces, respectively. Specifically, the two PCIe channels and the two first PCIe interfaces may be connected by using a conducting wire such as a copper wire. A quantity of PCIe channels included in the PCIe channel layer 111 is the same as a quantity of PCIe interfaces of the graphics processing unit card 10. For example, when the graphics processing unit card 10 has M (M≥2) PCIe interfaces, the PCIe channel layer 111 includes M channels. A specification of the PCIe channel may be set as required, for example, set to a channel specification of X1, X2, PCIeX4, X8, X12, X16, X32, or the like. The PCIe physical layer 112 provides an environment for data transmission.

The mode control module 113 is configured to identify a quantity of first PCIe interfaces 12 that are of the M first PCIe interfaces 12 and that can transmit data currently, to obtain an identification result; and determine to allocate the multiple multi-core stream processors 116 according to the identification result. Specifically, when there are two first PCIe interfaces 12, when it is discovered during initialization that there is only one first PCIe interface 12 that can transmit data, the mode control module 113 configures the graphics processing unit card 10 to be in a single-card mode; or when there are two first PCIe interfaces 12 that can transmit data, the mode control module 113 configures the graphics processing unit card 10 to be in an interface extended mode.

When the graphics processing unit card 10 is in a single-card mode, the graphics processing unit card 10 works in a regular mode, and an operating system identifies the graphics processing unit card 10 as a single graphics processing device. When the graphics processing unit card 10 is in an interface extended mode, the operating system identifies the graphics processing unit card 10 as two graphics processing devices, and by default, the mode control module 113 allocates, according to access IO bandwidth, the multi-core stream processors 116 to the two graphics processing devices according to a ratio. For example, when the two graphics processing devices are both connected to X16 PCIe3.0 channels, and there are a total of 14 multi-core stream processors 116, the mode control module 113 allows either of the two graphics processing devices to have seven multi-core stream processors 116 observed by the operating system. When one graphics processing device is connected to an X16 PCIe3.0 channel, and one graphics processing device is connected to an X16 PCIe2.0 channel, the mode control module 113 automatically allocates the multi-core stream processors 116 to the two graphics processing devices according to a ratio of 2:1 (because a bandwidth of the PCIe3.0 channel is about twice a bandwidth of the PCIe2.0 channel).

The data scheduling module 114 is configured to rearrange and cache data transmitted from different PCIe channels at different times, and schedule arranged data to different logical channels according to different modes of operation, to resolve a problem that data is not aligned in terms of time and space, thereby improving data synchronization.

The logical channel module 115 sends, to different multi-core stream processors for computation, the data sent from the data scheduling module 113, and then feeds back a computation result.

M first PCIe interfaces 12 electrically connected to the mainboard 20 are disposed on the graphics processing unit card 10, where M is greater than or equal to 2. In this way, input and output capabilities of the graphics processing unit card 10 are improved, and can match a processing capability of the main chip 11. This resolves a prior-art technical problem that the processing capability of the main chip cannot be fully utilized, and the problem is caused because there is only one PCIe interface, and as a result, the input and output capabilities of the graphics processing unit card is far lower than the processing capability of the main chip.

Although some embodiments of the present application have been described, persons skilled in the art can make changes and modifications to these embodiments once they learn the basic inventive concept. Therefore, the following claims are intended to be construed as to cover the preferred embodiments and all changes and modifications falling within the scope of the present application.

Obviously, persons skilled in the art can make various modifications and variations to this application without departing from the spirit and scope of this application. This application is intended to cover these modifications and variations of this application provided that they fall within the scope of protection defined by the following claims and their equivalent technologies.

What is claimed is:
1. An electronic device, comprising:
a graphics processing unit card, comprising a main chip and M first Peripheral Component Interface Express (PCIe) interfaces electrically connected to the main chip, wherein M is a natural number greater than or equal to 2;
a mainboard, comprising a central processing unit and M second PCIe interfaces connected to the central processing unit, wherein the M second PCIe interfaces are configured to connect to the M first PCIe interfaces; and
wherein the main chip of the graphics processing unit card comprises a mode control module configured to:
when identifying that only one first PCIe interface of the graphics processing unit card transmits data to the central processing unit of the mainboard, configure the graphics processing unit card to be in a single-card mode, or
when identifying that N first PCIe interfaces of the graphics processing unit card transmit data to the central processing unit of the mainboard, configure the graphics processing unit card to be in an interface extended mode, wherein N is a natural number less than or equal to M and greater than or equal to 2.
2. The electronic device according to claim 1, wherein:
one of the M first PCIe interfaces is directly connected to one of the M second PCIe interfaces in an insertion manner; and
M-1 first PCIe interfaces and M-1 second PCIe interfaces other than the first PCIe interface and the second PCIe interface that are connected in an insertion manner are connected by using a signal cable.
3. The electronic device according to claim 1, wherein:
a quantity of graphics processing unit cards is greater than or equal to 2; and
a quantity of central processing units of the mainboard is greater than or equal to 2.
4. The electronic device according to claim 3, wherein:
each graphics processing unit card comprises a first PCIe interface that is directly inserted into a second PCIe interface of the mainboard; and
multiple graphics processing unit cards are connected by using a signal cable.
5. The electronic device according to claim 4, wherein the mode control module is further configured to identify whether the electronic device is in a multiple-graphics processing unit card mode.
6. The electronic device according to claim 1, wherein:
when the graphics processing unit card is in a single-card mode, the graphics processing unit card is identified as a single graphics processing device; or
when the graphics processing unit card is in an interface extended mode, the graphics processing unit card is identified as N graphics processing devices.

7. The electronic device according to claim 6, wherein:
the main chip further comprises multiple multi-core stream processors;
when the graphics processing unit card is identified as a single graphics processing device, the mode control module is configured to allocate all the multiple multi-core stream processors to the single graphics processing device, or when the graphics processing unit card is identified as N graphics processing devices, the mode control module is configured to allocate the multiple multi-core stream processors to the graphics processing devices according to a bandwidth ratio of PCIe channels corresponding to the graphics processing devices; and
the N first PCIe interfaces of the graphics processing unit card correspond to N PCIe channels connected to the central processing unit of the mainboard.

8. The electronic device according to claim 7, wherein the main chip further comprises:
a data scheduling module configured to arrange data transmitted from different PCIe channels at different times, and schedule the arranged data to the logical channel module; and
a logical channel module configured to send, to different multi-core stream processors, the data sent from the data scheduling module.

9. A graphics processing unit card, comprising:
M Peripheral Component Interface Express (PCIe) interfaces configured to electrically connect to a mainboard, wherein M is an integer greater than or equal to 2; and
a main chip electrically connected to the M PCIe interfaces, and comprising a mode control module configured to:
when identifying that only one PCIe interface of the graphics processing unit card transmits data, configure the graphics processing unit card to be in a single-card mode, or
when identifying that N PCIe interfaces of the graphics processing unit card transmit data, configure the graphics processing unit card to be in an interface extended mode, wherein N is a natural number less than or equal to M and greater than or equal to 2.

10. The graphics processing unit card according to claim 9, wherein when M is equal to 2, the two PCIe interfaces are respectively disposed on two opposite sides of the graphics processing unit card.

11. The graphics processing unit card according to claim 9, wherein:
when the graphics processing unit card is in a single-card mode, the graphics processing unit card is identified as a single graphics processing device; or
when the graphics processing unit card is in an interface extended mode, the graphics processing unit card is identified as N graphics processing devices.

12. The graphics processing unit card according to claim 11, wherein:
the main chip further comprises multiple multi-core stream processors;
when the graphics processing unit card is identified as a single graphics processing device, the mode control module is configured to allocate all the multiple multi-core stream processors to the single graphics processing device, or when the graphics processing unit card is identified as N graphics processing devices, the mode control module is configured to allocate the multiple multi-core stream processors to the graphics processing devices according to a bandwidth ratio of PCIe channels corresponding to the graphics processing devices; and
the N PCIe interfaces of the graphics processing unit card correspond to N PCIe channels.

13. The graphics processing unit card according to claim 12, wherein the main chip further comprises:
a data scheduling module configured to arrange data transmitted from different PCIe channels at different times, and schedule the arranged data to the logical channel module; and
a logical channel module configured to send, to different multi-core stream processors, the data sent from the data scheduling module.

* * * * *